United States Patent Office 3,475,309
Patented Oct. 28, 1969

3,475,309
METHOD OF MAKING PARAMAGNETIC NICKEL FERRITE THIN FILMS
Richard J. Brook, Los Angeles, Calif., and William D. Kingery, Marion, Mass., assignors to the United States of America as represented by the United States Atomic Energy Commission
No Drawing. Filed June 21, 1967, Ser. No. 648,544
Int. Cl. C23c 15/00
U.S. Cl. 204—192                                          1 Claim

ABSTRACT OF THE DISCLOSURE

A method of producing thin films of nickel ferrite having controlled magnetic properties comprising reactive sputtering the films from a nickel-iron alloy cathode in an oxygen containing atmosphere onto a substrate wherein the magnetic properties depend on the temperature of the substrate during film formation. During deposition the substrate is maintained at a temperature between —15° C. and 0.0° C.

Background of the invention

Nickel ferrite materials are useful as computer memory cores. In order to miniaturize the cores the art has been seeking methods of preparing thin nickel ferrite films.

It is an object of this invention to provide those skilled in the art with a method of preparing highly pure thin nickel ferrite films having preselected specific magnetic properties.

Summary of the invention

A method of producing a highly pure thin nickel ferrite film comprising providing a substrate at a temperature between —15.0° C. and 600° C., vapor depositing a film of nickel ferrite on said substrate by reactive sputtering using a nickel-iron alloy cathode, said alloy having an iron to nickel weight ratio of about 1.80 iron to 1.0 nickel by weight, and an atmosphere containing up to 1.2 volume percent oxygen with the remainder of the atmosphere made up of an inert gas and thereafter permitting the film to come to room temperature.

Description of the invention

The nickel ferrite films of this invention are prepared by vapor phase deposition on a relatively low temperature substrate. Vaporization can be achieved by direct evaporation, by electron beam evaporation and cathodic sputtering such as reactive sputtering.

It is essential that the vapor phase be deposited on a low temperature substrate; that is, the substrate temperature must be low compared with the melting point of the material.

We have found that the magnetic properties of films prepared in the practice of our invention are directly related to the temperature of the substrate during film formation.

Films prepared on substrates having deposition temperatures between —15° C. and 0.0° C. are amorphous and paramagnetic. Films prepared on substrates having deposition temperatures between 0.0° C. and 300° C. are micropolycrystalline structures which are superparamagnetic. Films prepared on substrates having deposition temperatures between 300.0° C. and 600° C. have increased grain growth in the crystals and are ferrimagnetic. After films have been prepared in the practice of our invention crystalline grain growth can be achieved by heating the films at temperatures above 400° C. Thus, a paramagnetic film can be changed into a ferrimagnetic film simply by heating the film.

Example

The films were prepared by reactive sputtering. While other methods of deposition of films on substrates may be used, we prefer reactive sputtering for preparation of nickel ferrite films. By "reactive sputtering" we refer to sputtering which is accompanied by a chemical combination of the cathode material with the gas molecules used in the process. Reactive sputtering permits the substrate to the maintained relatively cool, i.e., below 0.0° C. which is of vital importance to the production of amorphous materials by the present method.

In preparing the samples, the cathode was an ingot of nickel-iron alloy formed by melting high purity (99.999%) nickel and iron sponge in vacuo in an induction furnace, the weight ratio of iron to nickel was 1.80 iron to 1.0 nickel by weight.

The sputtering chamber was evacuated to a vacuum of $10^{-5}$ torr by means of a mechanical forepump and an oil diffusion pump. A liquid nitrogen cooled baffle was inserted into the pumping system to prevent backstreaming of oil into the sputtering chamber.

Temperatures in the range from —170° C. to +600° C. were obtained by either controlling the flow of liquid nitrogen into a chamber backing the substrate or by inserting a wire wound resistance heater into this chamber.

After the desired substrate temperature was achieved, a reactive gas mixture containing up to 1.2 volume percent oxygen with the remainder of the mixture made of an inert gas, e.g., argon. When substrate temperature from 0.0° C. to —15° C. were used the mixture contained 0.3 volume percent oxygen and when higher substrate temperatures were employed, the gas mixture contained 1.2 volume percent oxygen. Before entering the sputtering chamber, the gases were mixed in a large glass container and dried with anhydrous magnesium perchlorate. The pressure in the chamber was increased to $5.5 \times 10^{-2}$ torr by introducing the reactive gas mixture into the chamber by means of a gas inlet valve to provide a suitable glow discharge.

Satisfactory sputtering rates were obtained by applying a voltage drop of 1.5 kv. and a current of 50 ma. between the electrodes. The anode probes were located approximately 1¾" above the nickel iron cathode.

Various substrates e.g. sodium chloride single crystals, thin 5 x 3 cms. coverglasses, vitreous silica slides etc. were employed in order to get films with varying dimensions so that the properties of the films could be tested. Film deposition times also were varied in order to provide films of various types for electrical conductivity measurements, electron microscope analysis and testing magnetic properties of the films. The length of time for deposition and the substrate temperature was varied widely so that a proper evaluation of the process could be achieved.

The following chart is given to indicate some of the properties found in films formed with varied substrate temperatures.

| Substrate Temp., ° C. | Crystal Structure | Magnetic |
|---|---|---|
| —15° C. to 0° C. | Amorphous | Paramagnetic. |
| 0° C. to 300° C. | Microcrystalline | Superparamagnetic. |
| 300° C. to 600° C. | Increased grain size | Ferrimagnetic. |

A further elaboration of the practice of our invention and a more detailed analysis of experimental techniques employed in the example given herein is given the doctoral thesis entitled "Nickel Ferrite ($NiFe_2O_4$) Thin Films," submitted by Richard John Brook to the Department of Metallurgy, Massachusetts Institute of Technology, in partial fulfillment of the requirements for the degree of Doctor of Science which was published at the Institute in July 1966.

We claim:
1. The method of producing a thin film of nickel ferrite having paramagnetic properties comprising providing a substrate, maintaining the substrate at a temperature between −15° C. and 0.0° C., vapor depositing a film of nickel ferrite on said substrate by reactive sputtering using a nickel iron alloy cathode containing an iron to nickel weight ratio of 1.80 iron to 1.0 nickel by weight and an atmosphere consisting of a mixture of containing up to 1.2 volume percent oxygen and an inert gas and thereafter permitting the film to come to room temperature.

References Cited

UNITED STATES PATENTS 3,160,576  12/1964  Eckert _____ 204—192

ROBERT K. MIHALEK, Primary Examiner